O. J. HICKS.
AUTOMOBILE TIRE.
APPLICATION FILED SEPT. 12, 1916.
1,223,049.
Patented Apr. 17, 1917.
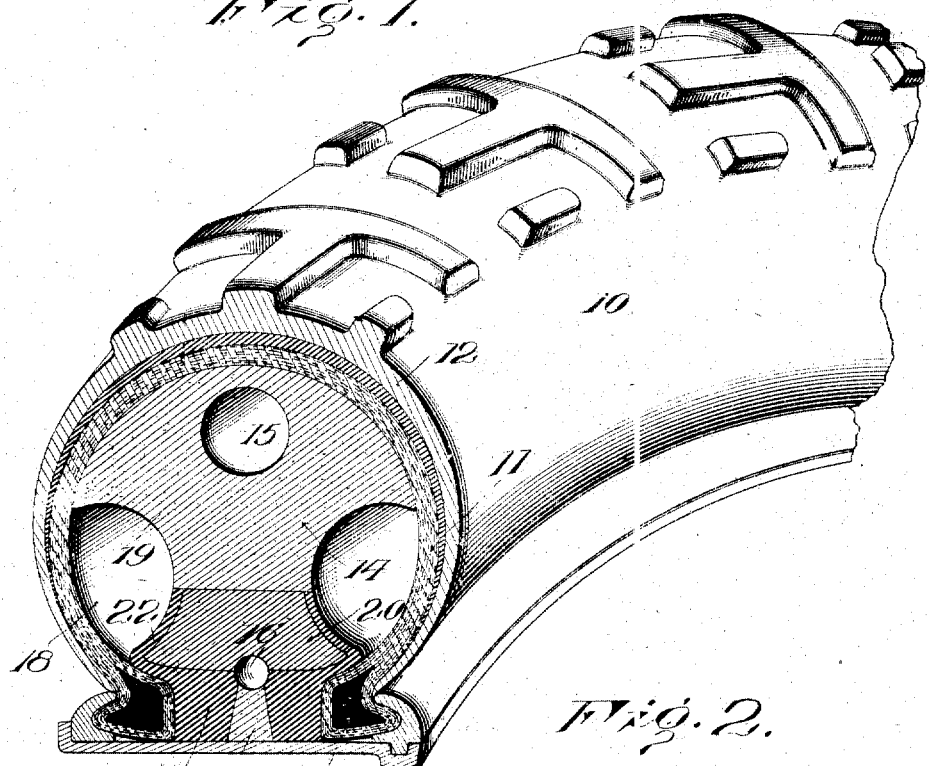
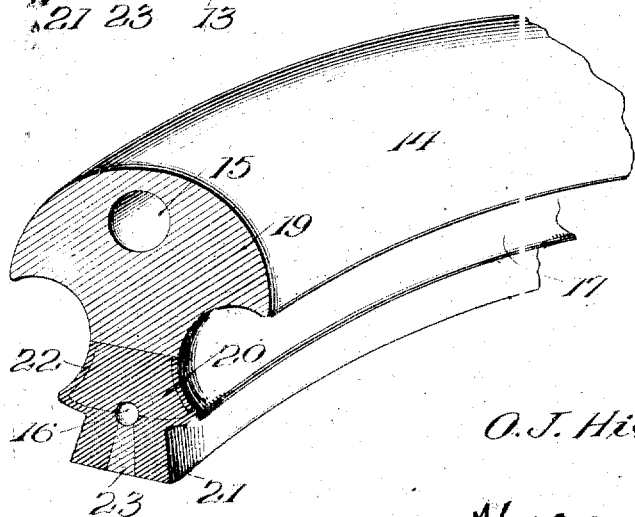
Inventor
O. J. Hicks.

UNITED STATES PATENT OFFICE.

OLIE J. HICKS, OF CENTERBURG, OHIO.

AUTOMOBILE-TIRE.

1,223,049.

Specification of Letters Patent.

Patented Apr. 17, 1917.

Application filed September 12, 1916. Serial No. 119,712.

*To all whom it may concern:*

Be it known that I, OLIE J. HICKS, a citizen of the United States, residing at Centerburg, in the county of Knox and State of Ohio, have invented certain new and useful Improvements in Automobile-Tires, of which the following is a specification.

My invention relates to new and useful improvements in tires and more particularly in tubeless tires, the primary object of my invention being the provision of a resilient core adapted to be inclosed within the usual casing or shoe now employed with pneumatic tubes in order to do away with the use of such tubes.

A still further object of my invention is to so construct the core that it may be readily applied to or removed from the casing or changed from one casing to another.

A still further object of my invention is to construct a core of the above described character in which suitable provision is made for circulation of air to prevent heating of the tire and in which the core is so built up as to offer suitable resistance to undue distortion and at the same time give proper resiliency.

A still further object of my invention consists in constructing the core with a relatively hard, rigid base to engage the rim of the wheel and to so arrange this base as to permit ready application of the tire and casing to rims of all types.

With these and other objects in view, my invention will be more fully described, illustrated in the accompanying drawings and then specifically pointed out in the claims which are attached to and form a part of this application.

In the drawings:

Figure 1 is a sectional perspective view of my improved core in a casing;

Fig. 2 is a corresponding view of a core removed from the casing.

Corresponding and like parts are referred to in the following description and indicated in all the views of the drawings by the same reference characters.

In order to insure a clear and accurate understanding of my invention, I have illustrated it in connection with a casing or shoe 10, such as is ordinarily employed as a protection for pneumatic tubes, this casing including the usual fabric plies 11 covered with the usual tread 12 of rubber or rubber composition, the fabric plies inclosing beads 13 which, in the present instance, are shown of the quick detachable type.

My improved core is indicated as a whole by the numeral 14 and, broadly speaking, is of a shape and proportion to, with the exception of certain air circulating passages, completely fill the space within the casing and between it and the rim when the casing is applied to the rim. In other words, the core is annular and substantially circular in cross section being formed with an inwardly directed radial and annular base portion to seat between the beads of the casing and to engage against the rim. This core is formed with an annular passage or chamber 15, preferably circular in cross section, and disposed centrally of the width of the core and adjacent its outer peripheral portion. The core is further formed with a second annular chamber or passage 16 circular in cross section and located centrally of the width of the core and a little above the line of the upper inner portions of the casing beads. Furthermore, the core, at each side, is formed with grooves or channels 17 which, when the core is mounted in the casing, together with the casing, provide substantially elliptical air chambers or passages 18 at either side of the casing and immediately above the beads thereof. These various passages afford a free circulation of air through the tire to prevent heating and also afford a certain amount of resiliency. Furthermore, the outermost chamber 15 allows the central portion of the tire to flatten, in use, to increase the area of tire surface engaging the ground and thus increase the tractive force of the tire and also create a pneumatic effect.

The outer portion of the core, to a point substantially midway of the depth of the grooves 17, is formed of soft rubber, while the remainder of the core, to a point about centrally of the chamber 16, is formed of medium hard rubber, these portions being indicated by the numerals 19 and 20. The remainder of the core, which is that portion seating between the beads of the casing when the core is in place and which is indicated at 21, is formed of hard rubber and this hard rubber has wings 22 which extend upwardly about the sides of the medium hard rubber section 20, as clearly indicated in Fig. 1. This base portion of hard rubber 21 is formed intermediate its width with a wedge-shaped channel opening into the chamber 16 and this channel is filled by a ring of soft rubber 23. It will, of course, be understood that all of these various sections of different grades or qualities of rubber are secured to each other by vulcanizing or other suitable means so that the core, when finished, is, to all intents and purposes, a one-piece structure.

The soft rubber outer portion 19 of the core gives the necessary resiliency and cushioning action, while the medium hard rubber intermediate portion 20 properly supports the outer portion of the core and is in turn reinforced by the wings 22 of the hard rubber base portion which serves to prevent inward movement of the casing beads which might cause release of the tire as a whole from its rim. The annular wedge 23 of soft rubber, however, permits such compression of the base portion of the core as is necessary to permit the application of the core and its casing to a suitable type of rim.

Although I have illustrated and described my invention in all its details of construction, it will of course be understood that I reserve the right to make any changes, within the scope of the appended claims, without in the slightest degree departing from the spirit of my invention.

Having thus described the invention, what is claimed as new is:

1. In a tire construction, the combination with an outer casing having rim engaging beads, of a resilient core adapted to seat within the casing, the core having a base portion adapted to seat between the beads and engage against a wheel rim, said base portion being of hard rubber with an intermediate annular strip of soft rubber.

2. In a tire construction, the combination with an outer casing having rim engaging beads, of a resilient core adapted to seat within the casing, the core having a base portion adapted to seat between the beads and engage against a wheel rim, said base portion being of hard rubber with an intermediate annular strip of soft rubber, the strip of soft rubber tapering in width from its inner to its outer edge and the core at the outer edge of the strip being formed with an annular chamber.

3. In a tire construction, the combination with an outer casing having rim engaging beads, of a core shaped to fit within the casing and formed adjacent its outer peripheral portion with an annular chamber and at either side with annular grooves which, with the casing, provide additional annular chambers, that portion of the core lying outside of the intermediate portion of the latter chambers being of soft rubber, that between the inner portions of the latter chambers being of medium hard rubber, and that inside of the last named portion being of hard rubber.

4. In a tire construction, the combination with an outer casing having rim engaging beads, of a core shaped to fit within the casing and formed adjacent its outer peripheral portion with an annular chamber and at either side with annular grooves which, with the casing, provide additional annular chambers, that portion of the core lying outside of the intermediate portion of the latter chambers being of soft rubber, that between the inner portions of the latter chambers being of medium hard rubber, and that inside of the last named portion being of hard rubber, said latter hard rubber portion having wings extending upwardly along the sides of the medium hard rubber portion.

5. In a tire construction, the combination with an outer casing having rim engaging beads, of a resilient core adapted to fit within the casing and having the base portion seating between the beads and adapted to engage against a wheel rim, the core adjacent its outer portion being formed with an annular chamber and in its inner side portions with annular grooves which, with the casing, provide annular chambers, and the core further being provided between the side chambers and immediately above the base portion with an additional annular chamber.

6. In a tire construction, the combination with an outer casing having rim engaging beads, of a resilient core adapted to fit within the casing and having the base portion seating between the beads and adapted to engage against a wheel rim, the core adjacent its outer portion being formed with an annular chamber and in its inner side portions with annular grooves which, with the casing, provide annular chambers, and the core further being provided between the side chambers and immediately above the base portion with an additional annular chamber, that portion of the base between the rim engaging face and latter chamber being formed of soft rubber, while the remainder of the base and lower side walls of the side chambers are formed of hard rubber and the space between the hard rubber side walls of the chambers of medium hard rubber and the remainder of the core of soft rubber.

7. A core adapted to be employed within a tire casing and shaped to fit therein, the outer portion of the core being of soft rubber, the intermediate portion of medium hard rubber, and the base portion of hard rubber with a soft rubber wedge intermediate its width and the core being formed with radially spaced annular chambers and at its side with chamber providing grooves.

8. A core adapted to be employed within a tire casing and shaped to fit therein, the outer portion of the core being of soft rubber, the intermediate portion of medium hard rubber, and the base portion of hard rubber with a soft rubber wedge intermediate its width and the core being formed with radially spaced annular chambers and at its sides with chamber providing grooves, the inner annular chamber being arranged to permit expansion of the soft rubber wedge into it upon compression of the base portion of the core.

9. A core adapted to be employed within a tire casing and shaped to fit therein, the material of which the core is made being resilient and increasing in resiliency from its inner to its outer portion.

10. A core adapted to be employed within a tire casing and shaped to fit therein, the outer portion of the core being of relatively soft rubber composition, and a base portion of relatively hard rubber composition with an annular insert of relatively soft rubber composition.

11. A core adapted to be employed within a tire casing and shaped to fit therein, the material of the outer portion of the core being highly resilient, the material of the inner portion or base being slightly resilient, and the material of the intermediate portion possessing a degree of resiliency less than that of the outer portion and greater than that of the base portion.

In testimony whereof I affix my signature.

OLIE J. HICKS. [L. S.]